United States Patent
Li et al.

(10) Patent No.: US 6,870,581 B2
(45) Date of Patent: Mar. 22, 2005

(54) SINGLE PANEL COLOR VIDEO PROJECTION DISPLAY USING REFLECTIVE BANDED COLOR FALLING-RASTER ILLUMINATION

(75) Inventors: Lin Li, Vancouver, WA (US); Jeffrey Brian Sampsell, Vancouver, WA (US); Jagtar Singh Saroya, Washougal, WA (US); George Stuart Vernon, Milwaukie, OR (US)

(73) Assignee: Sharp Laboratories of America, Inc., Camas, WA (US)

( * ) Notice: Subject to any disclaimer, the term of this patent is extended or adjusted under 35 U.S.C. 154(b) by 475 days.

(21) Appl. No.: 10/003,947

(22) Filed: Oct. 30, 2001

(65) Prior Publication Data

US 2003/0081150 A1 May 1, 2003

(51) Int. Cl.[7] ................................................. H04N 5/74
(52) U.S. Cl. ............................. 348/756; 353/31; 349/9; 359/216
(58) Field of Search ................................. 348/756, 760, 348/761, 766, 771, 781, 782; 349/7–9; 353/30, 33, 34, 37; 359/209, 212, 216, 219, 627, 629, 638

(56) References Cited

U.S. PATENT DOCUMENTS

| | | | |
|---|---|---|---|
| 4,938,596 A | * | 7/1990 | Gauthier et al. ............ 356/515 |
| 5,410,370 A | | 4/1995 | Janssen |
| 5,548,347 A | | 8/1996 | Melnik et al. |
| 5,608,467 A | | 3/1997 | Janssen et al. |
| 5,781,251 A | | 7/1998 | Otto |
| 5,845,981 A | | 12/1998 | Bradley |
| 5,892,623 A | * | 4/1999 | Bradley ...................... 359/618 |
| 5,920,361 A | * | 7/1999 | Gibeau et al. .............. 348/750 |
| 6,018,214 A | * | 1/2000 | De Vaan ..................... 313/112 |
| 6,336,724 B1 | * | 1/2002 | Shouji et al. ................. 353/20 |
| 6,661,475 B1 | * | 12/2003 | Stahl et al. .................... 349/9 |

OTHER PUBLICATIONS

D. Scott Dewald, Steven M. Penn, Michael Davis; "40.2: Sequential Color Recapture and Dynamic Filtering: A Method of Scrolling Color"; *SID 01 Digest*; pp. 1076–1079.
European Patent Office, European Search Report Application No. EP 02 02 3966 Applicant: Sharp Kabushiki Kaisha.

* cited by examiner

*Primary Examiner*—Victor R. Kostak
(74) *Attorney, Agent, or Firm*—Johnson & McCollom, P.C.

(57) ABSTRACT

A projection display system. The projection system includes a light source, illumination optics that are capable of splitting the light from the source into individual color bands, and folding mirrors. The folding mirrors operate to direct the color bands to a reflective element that has a contoured surface. The contoured surface of the reflective element causes the light to form into scanning rasters that are recombined and sent to a spatial light modulator. The spatial light modulator is typically made up of a panel of individually addressable elements. If the spatial light modulator requires polarized light, a polarizing beam splitter and quarter-wave plate are included as part of the illumination optics.

9 Claims, 4 Drawing Sheets

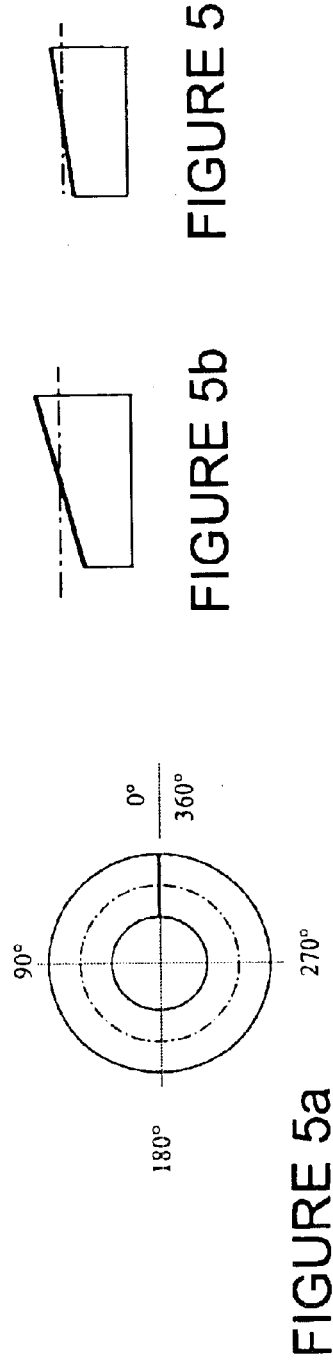

SINGLE PANEL COLOR VIDEO PROJECTION DISPLAY USING REFLECTIVE BANDED COLOR FALLING-RASTER ILLUMINATION

BACKGROUND

1. Field

This disclosure relates to projection displays, more particularly to projection displays using reflective banded color falling-raster illumination.

2. Background

Video projection displays using panels of light valves have undergone rapid growth and expansion in the past few years. These panels, such as liquid crystal displays (LCD) and digital micromirror devices (DMD), generally comprise arrays of individually addressable elements, such as an LCD cell or a mirror. The LCD-based panels may transmit light, where the light passes through the cell, or reflect the light, where the light bounces off of the cell or material directly behind the cell. Generally, except for some instances of image scaling, each element on the panel corresponds to a picture element (pixel) in the final image.

In order to achieve color displays, the panel-based projection systems typically take one of two forms. In the first, one color panel is assigned to each of the traditional three display colors, red, green and blue. However, because of the necessity of having three panels, these systems tend to be larger and more expensive than the other option, which is a one-panel system illuminated with each of the three colors in sequence. In some versions of this architecture, a white light source is used with a segmented color wheel having one segment for each color that spins in front of the light. Each element in the array modulates the colors for the corresponding pixel in sequence, relying upon the integration properties of the eye to blend the three sequenced colors together into a pixel of a particular color.

A disadvantage of this type of approach is that only one color is displayed at a time, resulting in a loss of two-thirds the efficiency of a three-panel system. Advantages include lower cost with fewer panels and no need for the mechanisms to ensure that images from the three panels are aligned correctly, as well as a shorter back-working distance for the optics, resulting in smaller systems.

One method to improve light efficiency scrolls sequential color bands across the panel. An example of this is shown in U.S. Pat. No. 5,410,370, issued Apr. 25, 1995. Typically, a white light source is separated and shaped into red, green and blue bands. Scanning optics, typically consisting of rotating prism blocks with square cross sections, cause the bands to be sequentially scanned across the elements. As a band passes over the 'top' of the active area of the panel, a band of that light color also appears at the 'bottom' of the panel. Prior to each band of light passing over a given row of elements, that row will be addressed with the appropriate signals to provide the color content of that frame to the corresponding pixels in the image. The image is then projected onto the screen, and the integration properties of the human visual system will integrate it into a complete image. The color bands are moving, and the elements are responding, so quickly that the impression of the viewer is simultaneous full color.

One requirement of a falling raster illumination system is that the color bands (rasters) maintain good uniformity in shape and intensity as they scan down the panel. In order to improve uniformity, current art modifies the surfaces of the rotating block scanning optics to be cylindrically concave. However, this makes the manufacture of the prisms much more difficult and complicated, increasing the costs. Other approaches use an optical medium with varieted thickness, usually a cylindrical, egg-shaped spiral. However, this last approach requires large volume and decreases the efficiency of the optical system.

Additionally, the current art does not achieve uniform illumination across the panel, because the light bands change their dimensions due to variations in the path length of the illumination system to the image plane as the rotating prisms scan the light beam across the light valve. Another difficulty lies in the positioning of the scanning prisms. In one example, the light needs to be focused prior to entering the prism, and requires the use of an extra aperture. This requires relay optics, further raising the complexity of the system.

SUMMARY

One aspect of the disclosure is a projection display system. The display system includes illumination optics that can split light from a light source into individual color bands. The individual color bands are directed to a spinning reflective element having a contoured surface. The contoured surface causes the color bands to be imaged as scanning rasters on a spatial light modulator, a panel of individually addressable elements.

In one embodiment, the spatial light modulator requires polarized light and the illumination optics include a polarizing beam splitter.

In another embodiment, the spatial light modulator is reflective.

In yet another embodiment, the spatial light modulator is transmissive.

BRIEF DESCRIPTION OF THE DRAWINGS

The invention may be best understood by reading the disclosure with reference to the drawings, wherein:

FIGS. 5a–5e show side views at different positions of a reflective element, in accordance with the invention.

FIG. 6 shows a side view of a reflective element discontinuity, in accordance with the invention.

DETAILED DESCRIPTION OF THE EMBODIMENTS

Figure 1:
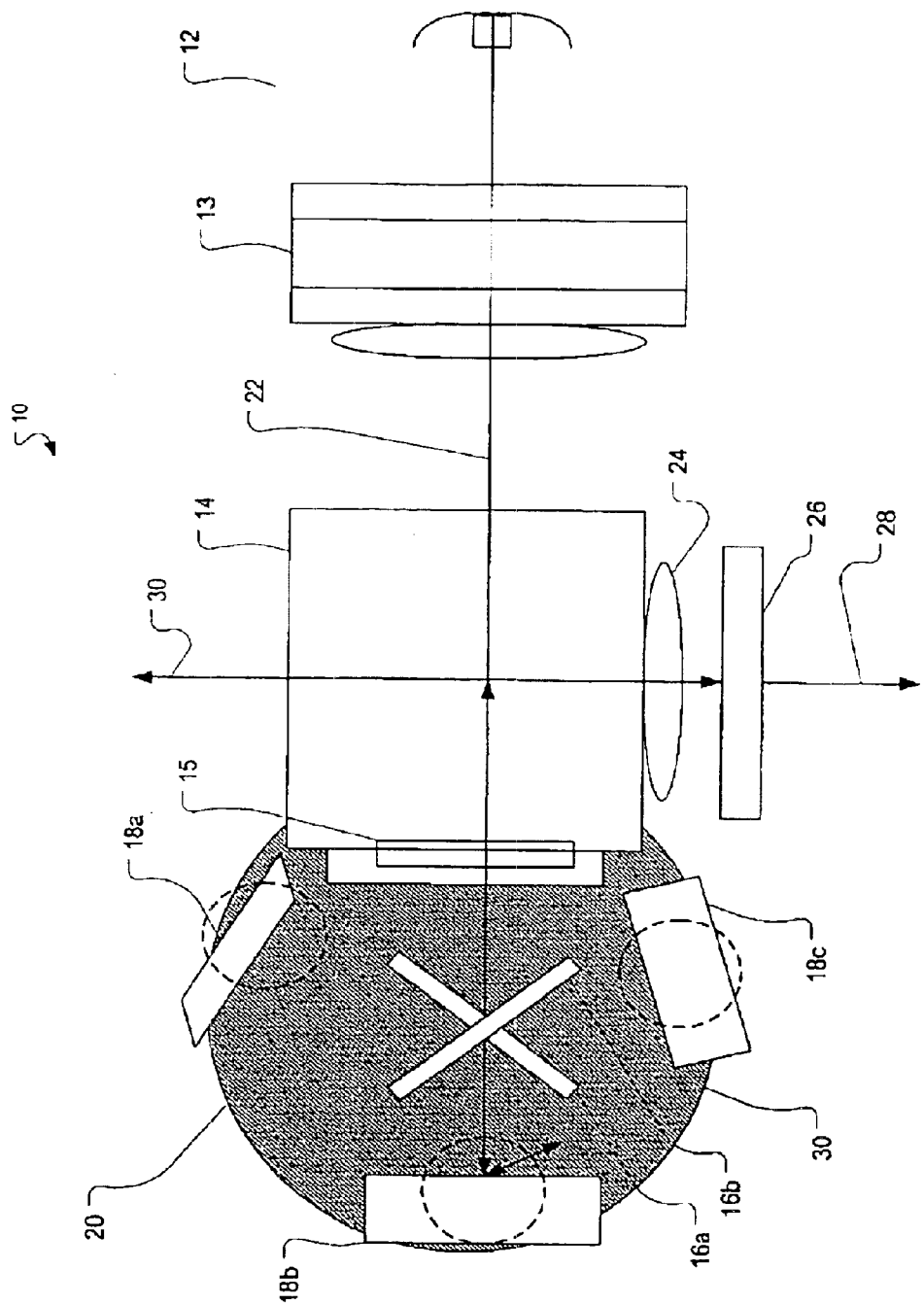
FIG. 1 shows a top view of one embodiment of a projection display system, in accordance with the invention.

FIG. 1 shows one embodiment of a projection display system 10 in accordance with the invention. A light source 12 provides white light. A light integrator 13 shapes and homogenizes the light providing uniform illumination. The example shown in FIG. 1 could be used with light valves that require either polarized or unpolarized light. The projection display system shown in FIG. 1 uses a polarizing beam splitter 14 in conjunction with a quarter-wave ($\lambda/4$) plate 15. The quarter wave plate converts the linearly polarized light exiting the polarizing beam splitter into circularly polarized light. For a display system not requiring polarized light, the beam of light would be randomly polarized and an air-gap prism could be used in place of the polarizing beam splitter.

After the light passes through the polarizing beam splitter, dichroic mirrors 16a and 16b split the light into red, green and blue paths with 120-degree angular separation. As will be discussed in more detail, it is possible to use other angles of separation. The dichroic mirrors could be cross-located dichroic filters deposited on thin glass plates, or coated on the internal surfaces of the four elements of a six-sided prism. Each color channel has a 45-degree tilted folding mirror, 18a–18c, to direct each colored light down to a reflective element 20. Alternatively, the mirrors 18a–18c could be right-angle prisms. The reflective element 20 is shaped substantially disc-like, with a contoured top surface that receives the light from the folding mirrors 18a–18c. This will be discussed in more detail with reference to FIGS. 3–5.

In operation, white light from light source 12 passes through the light integrator 13. The example of FIG. 1 is for a polarized light projection system. The light travels through the polarizing beam splitter 14 and $\lambda/4$ plate 15 and the circularly polarized light strikes the dichroic mirrors 16a and 16b. In some cases, the beam splitter and $\lambda/4$ plate combination will be followed by a beam focusing lens and a beam shaping lens at position 17. The focusing lens may have the function of a relay lens pair since light traverses this position twice, traveling away from and back towards the polarizing beam splitter 14. These dichroic mirrors separate the light and direct it to the folding mirrors 18a–18c, which in turn direct the light down to the contoured surface of the reflective element 20. The $\lambda/4$ 15 may be replaced by three individual $\lambda/4$ plates, one in each colored light path, as shown by the circles drawn with dotted lines. The reflective element 20 returns the light to the folding mirrors and the folding mirrors reflect the light back to the dichroic filters. However, the reflective element 20 has shifted the return path of each color band slightly from the incoming path.

In the pre-reflection path up to the point of being reflected by the reflective element 20, the light was either shaped white light or three color bands of light that could be recombined to form the shaped white light. After being reflected by the reflective element 20, the color bands are no longer combined back into one band of white light. Since the reflective element 20 has shifted each color band slightly, the recombination results instead of three spatially separated bands of color. These three bands of color then travel through the polarizing beam splitter 14 and $\lambda/4$ plate 15. This serves to convert the reflected, circularly polarized light, whose direction of rotation has been reversed by reflection from element 20, into linearly polarized light perpendicular to that of the input beam. The beam splitter 14 then directs the light to a field lens 24 for telecentric illumination, through which the light travels to the panel of light valves, referred to as a spatial light modulator, 26.

The spatial light modulator 26 will typically comprise an array of individually addressable elements. If the spatial light modulator 26 is a transmissive LCD, the light will pass through it as determined by the state of each element, along the path 28 of FIG. 1. If the spatial light modulator is a reflective device, such as a reflective LCD or a DMD, the light will be reflected along path 30 of FIG. 1 to a projection lens. The reflective spatial light modulators may also be used with a second polarizing beam splitter, not shown, after the field lens 24. The image plane will have to move forward slightly to match the increased optical path for this option.

Figure 2:
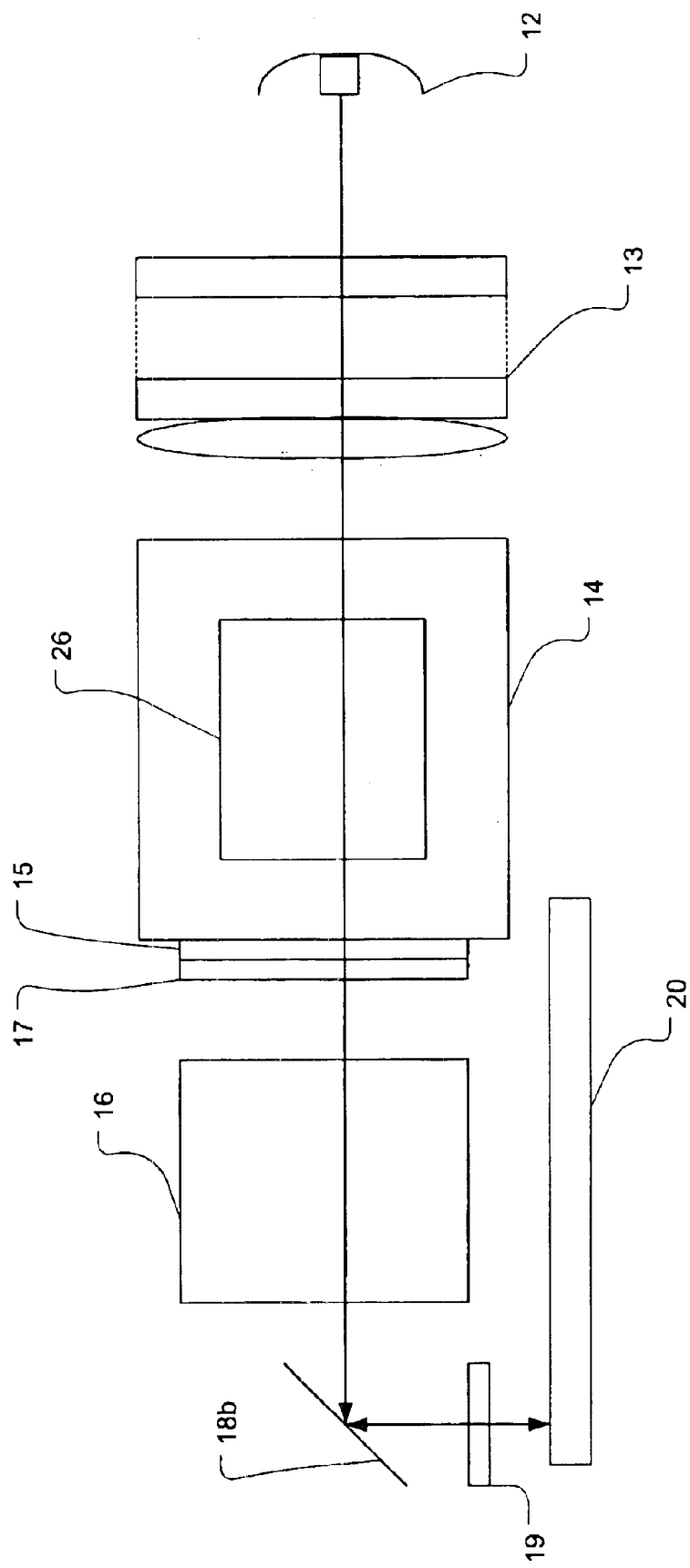
FIG. 2 shows a side view of one embodiment of a projection display system, in accordance with the invention.

FIG. 2 shows a side view of one embodiment of a projection display system. As can be seen in FIG. 2, the system is very similar to that shown in FIG. 1. However, in this view it is possible to see the arrangement of the reflective element 20 below the plane of the dichroic filters 16a and 16b and the folding mirrors 18a–18c. The architecture may also include another quarter-wave plate 19 to manage the circular polarization of the light. It is possible to put the reflective element elsewhere, such as above the plane of the dichroic filters, etc., in which case the actual bottom surface of the reflective element would have the contoured surface. However, for purposes of this discussion, the 'top' of the reflective element will be defined as that surface which receives the light from the folding mirrors and the dichroic filters.

In FIGS. 1 and 2, the light integrator 13 may include a fly's eye integrator and a polarization converter. A polarization converter preserves the light that is not of the proper polarization for a spatial light modulator requiring polarized light. The polarization converter converts the light of the 'wrong' polarization to the 'right' polarization to allow the system to use all available illumination.

Figure 3:
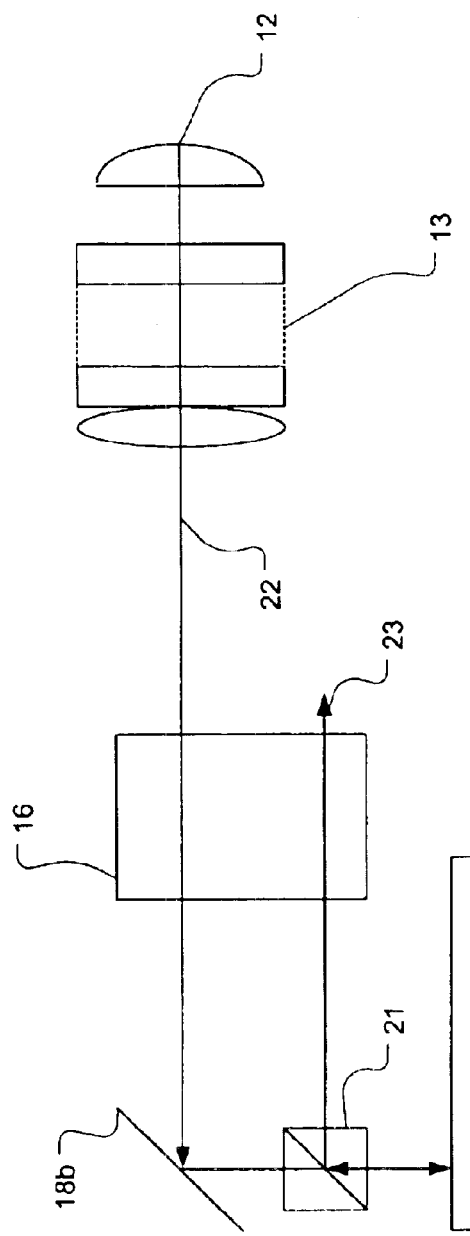
FIG. 3 shows an alternative embodiment of a projection display system, in accordance with the invention.

Another alternative embodiment of a projection display system is shown in FIG. 3. In this embodiment the output path is separated from the input path. Some components of the system have been eliminated from the drawings for better understanding of the invention. The light from source 12 passes through the light integrator 13, and goes directly to the dichroic mirrors. As it passes through the dichroic mirror 16, one of the color components impinges upon folding mirror 18b and travels through the polarizing beam splitter 21 on its way to the reflector 20. In the embodiment of FIG. 3, however, the light reflected from the reflector 20 changes its direction at beam splitter 21. Three colored beams are recombined at the dichroic mirrors 16 and goes to the panel. With this configuration, the dichroic mirrors work with "S" polarization light.

There could be one polarizing beam splitter and $\lambda/4$ plate for each of the color components, or one for all three depending upon the type of element desired and how it was configured. For example, element 14a could be a half-silvered mirror instead of a polarizing beam splitter. A polarizing beam splitter may reflect light from the other two color component paths, the filter passing light traveling along path 23, but reflecting light from the reflector. This element or elements causes the reflected light from the reflector 20 to be directed along a different path. This may have some advantages for systems in which different aspects of the input light and the output light are to be manipulated, providing separation of these paths. In this embodiment, when a relay lens pair is desired to be used, two lens elements will be required. One element is required in path 22 and one in path 23.

Figure 4:
FIG. 4 shows a perspective drawing of one embodiment of a reflective element, in accordance with the invention.

FIG. 4 shows a perspective drawing of one embodiment of the reflective element 20, in accordance with the invention. As can be seen, the element is disc-shaped, with a hole in the middle to accommodate an axel that allows it to spin. The element spins fast enough to cause the color bands to scan the device at least three times the typical video field rate. The colors strike the reflective element 120 degrees out of phase with each other. As mentioned above, the 120-degree separation is not necessary. Other phase relationships may also be used. As the color bands scan across the device, each row of individually addressable elements is addressed to image that row of pixels in that color to the projection surface.

As will be seen with reference to FIGS. 5a–5f, the reflective element surface is formed so as to cause a new band of a color to appear at the 'top' of the array as a band of the same color reaches the 'bottom' of the device, for a 120-degree separation. The terms top and bottom are relative, as the device could be scanned vertically, as discussed here, or inversely vertical, from bottom to top or from side to side.

The surface of the reflective element can be contoured to suit the particular angles of the projection system in which it is used, such as off-axis configurations. Additionally, the surface can be contoured to add optical power to the system, such as a concave surface to provide a slight power boost. However, as discussed here, one embodiment of the reflective surface can be discussed in terms of its profile at various positions. The positions are as if looking at a circle (or 360° arc) divided up into degrees. As viewed from the side, the profile at each of a group of positions can be used to describe this surface. In this particular embodiment five positions are used. FIG. 5a shows one method for describing the surface in degrees as discussed above. The surface of the element is continuous between these points, but these points are useful references for describing the element.

The profiles of one embodiment of the reflective element, as viewed from the side, are shown in FIGS. 5b–5e. FIG. 5b shows a profile of the reflective element at 0 degrees. The angle of the surface is referred to here as the tilt angle. This tilt angle is described here as an angle of positive (+) δ degrees, which places the strip of the color hitting the reflective element at this position. FIG. 5c shows a profile of the reflective element at 90 degrees. The tilt angle here is half that at 0 degrees, or +δ/2.

FIG. 5d, at 180 degrees, the disc has a flat profile relative to the incoming light. This places the color band in the middle of the device. To move the color band to the 'bottom' half of the device, the surface will be opposite that at the corresponding positions at the 'top' half of the device. At 270 degrees, the tilt angle is −δ/2, and at 360 degrees it is −δ, as shown at FIGS. 5e and 5f. In most cases, the tilt angle, δ, will have a magnitude in the range of 2 to 10 degrees from 'flat.'

One aspect is that there is a discontinuity between the position that causes the light to strike the top of the panel, and the position that causes the light to strike the bottom of the panel. This causes the light to 'jump' from the bottom of the panel back to the top. This is shown in FIG. 6. It must be noted that this is just one possible way to characterize the reflective element. Depending upon the projection system used, and the spatial light modulator, the profile may never be 'flat,' such as for spatial light modulators requiring off-axis illumination.

Some further considerations may include over scanning to compensate for the time when the incident light falls on the splitting light of the reflective element, which is the discontinuity between 0° and 360°. This over scan period depends upon the dimension of the beams and the overall size of the reflective element. In one embodiment of the invention, the over scan period was about 5% of the total scan period, so the system has an efficiency of approximately 95%. Anamorphic optics can be used to reduce the beam foot print size at the reflective element, further minimizing the over scan period.

The scanning illumination can be adjusted for specific characteristics of particular projection display systems. For example, the above embodiments of the disc assume equal spacing between the color bands. If compensation for unequal response of the spatial light modulator to different wavelengths of light is needed, for example, the orientation of the dichroic filters will achieve unequal spacing of the color bands relative to the plane of the reflective element.

Thus, although there has been described to this point a particular embodiment for a method and apparatus for a projection display system, it is not intended that such specific references be considered as limitations upon the scope of this invention except in-so-far as set forth in the following claims.

What is claimed is:

1. A projection display system, comprising:
   a light source operable to produce a white light beam;
   illumination optics operable to separate the white light beam into at least two beams of light each of different colors;
   a panel of individually addressable elements;
   a spinning reflective element operable to reflect the at least two beams of light from the illumination optics to the panel of individually addressable elements as a scanning raster, and
   projection optics operable to project an image received from the panel to a display surface.

2. The projection display system of claim 1, wherein the illumination optics further comprise:
   a light integrator operable to receive the light from the light source;
   a polarizing beam splitter and quarter-wave plate operable to receive the light from the light integrator and rotate the light to a polarization state 90 degrees away from a current polarization state;
   dichroic mirrors operable to receive the light from the polarizing beam splitter and split the light into at least two colors;
   fold mirrors operable to reflect light received from the dichroic mirrors to the spinning reflective element, wherein there is a fold mirror for each of the colors;
   a field lens operable to allow telecentric illumination.

3. The projection display system of claim 2, wherein the illumination optics further comprise relay optics between the polarizing beam splitter and the spinning reflective element.

4. The projection display system of claim 1, wherein the illumination optics further comprise:
   a light integrator operable to receive the light from the light source;
   dichroic mirrors operable to receive the light from the light integrator and split the light into at least two colors;
   fold mirrors operable to reflect light received from the dichroic mirrors to the spinning reflective element, wherein there is fold mirror for each of the colors; and
   a field lens operable to allow telecentric illumination.

5. The projection display system of claim 1, wherein the panel of individually addressable elements further comprises a transmissive liquid crystal display panel.

6. The projection display system of claim 1, wherein the panel of individually addressable elements further comprises a reflective liquid crystal display panel.

7. The projection display system of claim 1, wherein the panel of individually addressable elements further comprises a digital micromirror device panel.

8. The projection display system of claim 1, wherein the projection optics further comprises a projection lens.

9. The projection display system of claim 1, wherein the projection optics further comprise a projection lens and a second polarizing beam splitter.

* * * * *